United States Patent
Tano et al.

(10) Patent No.: US 10,459,315 B2
(45) Date of Patent: Oct. 29, 2019

(54) ELECTRONIC APPARATUS FOR DISPLAYING OVERLAY IMAGES

(71) Applicant: KYOCERA Corporation, Kyoto (JP)

(72) Inventors: Masaki Tano, Tokyo (JP); Atsuhiko Kanda, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 15/902,550

(22) Filed: Feb. 22, 2018

(65) Prior Publication Data

US 2018/0239221 A1 Aug. 23, 2018

Related U.S. Application Data

(60) Provisional application No. 62/469,051, filed on Mar. 9, 2017.

(30) Foreign Application Priority Data

Feb. 23, 2017 (JP) ................................. 2017-032688

(51) Int. Cl.
*G03B 17/02* (2006.01)
*H04N 5/225* (2006.01)
(Continued)

(52) U.S. Cl.
CPC ............. *G03B 17/02* (2013.01); *G03B 17/20* (2013.01); *H04N 5/2252* (2013.01);
(Continued)

(58) Field of Classification Search
CPC .... G03B 17/02; H04N 5/2252; H04N 5/2253; H04N 5/23229; H04N 5/272
See application file for complete search history.

(56) References Cited

U.S. PATENT DOCUMENTS

| 7,436,434 B2 | 10/2008 | Shibutani |
| 8,180,567 B2 * | 5/2012 | Geelen .............. G01C 21/3647 340/995.2 |

(Continued)

FOREIGN PATENT DOCUMENTS

| JP | H09-027937 A | 1/1997 |
| JP | 2001-061089 A | 3/2001 |

(Continued)

OTHER PUBLICATIONS

An Office Action; "Notice of Reasons for Refusal," mailed by the Japanese Patent Office dated Mar. 28, 2017, which corresponds to Japanese Patent Application No. 2017-032688, with English language Concise Explanation.

(Continued)

*Primary Examiner* — Nicholas G Giles
(74) *Attorney, Agent, or Firm* — Studebaker & Brackett PC

(57) ABSTRACT

An electronic apparatus that effectively utilizes information detected by a sensor is provided. The electronic apparatus includes a camera, a sensor, a memory, a display, and a processor. The at least one processor causes the display to display a preview image in which dynamic sensor information acquired by the sensor is overlaid on a captured image captured by the camera. The at least one processor stores the preview image in which the dynamic sensor information is overlaid on the captured image as an overlay still image in the memory.

6 Claims, 10 Drawing Sheets

(51) Int. Cl.
 H04N 5/232 (2006.01)
 H04N 5/272 (2006.01)
 G03B 17/20 (2006.01)
(52) U.S. Cl.
 CPC ....... *H04N 5/2253* (2013.01); *H04N 5/23229* (2013.01); *H04N 5/23293* (2013.01); *H04N 5/272* (2013.01)

(56) References Cited

U.S. PATENT DOCUMENTS

| | | | | |
|---|---|---|---|---|
| 8,423,292 | B2* | 4/2013 | Geelen | G01C 21/26 340/995.2 |
| 2003/0231243 | A1 | 12/2003 | Shibutani | |
| 2005/0182564 | A1* | 8/2005 | Kim | G01C 21/3644 701/468 |
| 2009/0125234 | A1* | 5/2009 | Geelen | G01C 21/3647 701/533 |
| 2010/0250115 | A1 | 9/2010 | Ohata et al. | |
| 2011/0267511 | A1* | 11/2011 | Imafuji | H04N 5/23212 348/294 |
| 2012/0185165 | A1* | 7/2012 | Geelen | G01C 21/3647 701/436 |
| 2016/0320186 | A1 | 11/2016 | Tanabe et al. | |

FOREIGN PATENT DOCUMENTS

| | | |
|---|---|---|
| JP | 2004-080740 A | 3/2004 |
| JP | 2009-150839 A | 7/2009 |
| JP | 2011-135418 A | 7/2011 |
| JP | 2011-193208 A | 9/2011 |
| JP | 2015-121481 A | 7/2015 |
| JP | 2016-057088 A | 4/2016 |
| WO | 2007/066696 A1 | 6/2007 |

OTHER PUBLICATIONS

An Office Action; "Notice of Reasons for Refusal," mailed by the Japanese Patent Office dated May 30, 2017, which corresponds to Japanese Patent Application No. 2017-091440, with English language Concise Explanation.

An Office Action; "Notice of Reasons for Refusal," mailed by the Japanese Patent Office dated Nov. 21, 2017, which corresponds to Japanese Patent Application No. 2017-215611, with English language Concise Explanation.

* cited by examiner

FIG. 5

| Sensor information \ Usage | Surfing and marine sports | Mountaineering | Skiing and snowboarding | Cycling | Fishing | Trekking |
|---|---|---|---|---|---|---|
| Speed information | ○ | ○ | ○ | ○ | | |
| Distance information | ○ | ○ | ○ | ○ | | |
| Altitude information | | ○ | ○ | ○ | | ○ |
| Gravitational acceleration information | ○ | ○ | ○ | ○ | | ○ |
| Atmospheric pressure information | | ○ | ○ | | ○ | ○ |
| Trip route information | ○ | ○ | ○ | ○ | ○ | ○ |
| Wind speed information | | ○ | ○ | ○ | | |
| Orientation information | | ○ | ○ | ○ | | |

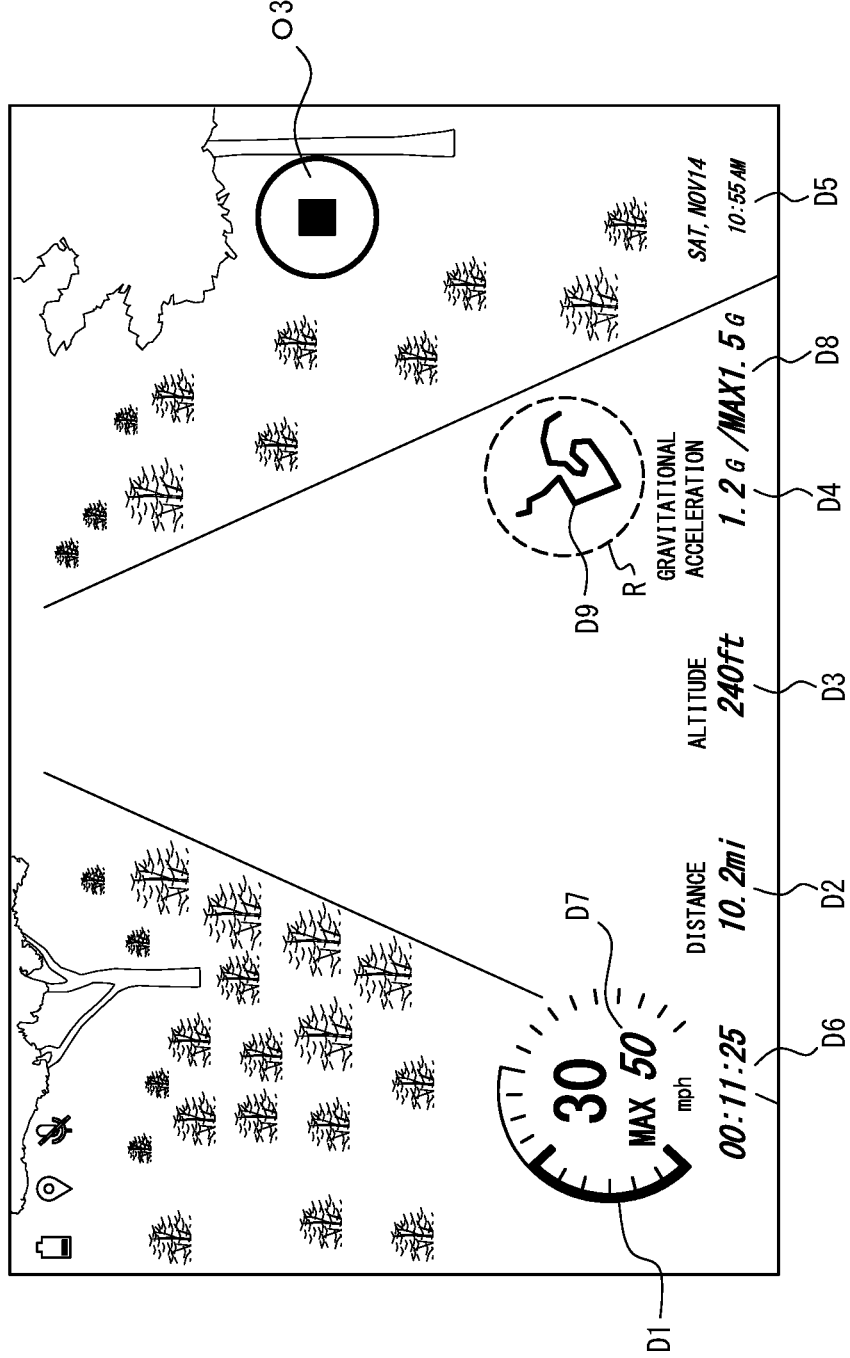

ELECTRONIC APPARATUS FOR DISPLAYING OVERLAY IMAGES

CROSS-REFERENCE TO RELATED APPLICATIONS

The present application claims priority to and the benefit of U.S. Provisional Application No. 62/469,051 filed Mar. 9, 2017 and Japanese Patent Application No. 2017-032688 filed Feb. 23, 2017, the entire contents of which are incorporated herein by reference.

TECHNICAL FIELD

The present disclosure relates to an electronic apparatus.

BACKGROUND

Electronic apparatuses configured to cause the display to display an image and, together with the image, date information related to the image are conventionally known. For example, PLT 1 set forth below discloses an electronic apparatus which causes the display to display an image together with date information.

Also, electronic apparatuses having various sensors are conventionally known. For example, PLT 2 set forth below discloses an electronic apparatus configured to calculate a state thereof on the basis of information detected by an acceleration sensor and a pressure sensor.

SUMMARY

An electronic apparatus according to the present disclosure includes a camera, a sensor, a memory, a display, and a processor. The processor is configured to cause the display to display a preview image in which dynamic sensor information acquired by the sensor is overlaid on a captured image captured by the camera, and to store the preview image in which the dynamic sensor information is overlaid on the captured image as an overlay still image in the memory.

An electronic apparatus according to the present disclosure includes a camera, a sensor, a memory, a display, and a processor. The processor is configured to cause the display to display a preview image in which dynamic sensor information acquired by the sensor is overlaid on a captured image captured by the camera, and to store the preview image in which the dynamic sensor information is overlaid on the captured image as an overlay video image in the memory.

BRIEF DESCRIPTION OF THE DRAWINGS

In the accompanying drawings:

FIG. 5 is a diagram illustrating an example of the setting table illustrated in FIG. 3.

FIG. 8 is a diagram illustrating an example of the preview image displayed on the display illustrated in FIG. 3 during storage processing of an overlay video image.

DETAILED DESCRIPTION

It is desired to effectively utilize information detected by various sensors provided to an electronic apparatus.

In light of this, the present disclosure aims to provide an electronic apparatus that effectively utilizes information detected by sensors.

The electronic apparatus according to an embodiment of the present disclosure is capable of effectively utilizing information detected by the sensor.

Hereinafter, an embodiment of the present disclosure will be described with reference to the accompanying drawings.

First, a comparison between the present embodiment and the inventions described in the related art will be described. The disclosure described in the PLT 1 displays date information together with an image in a display. The disclosure described in the PLT 2 determines a state of the device itself on the basis of information detected by an acceleration sensor and an atmospheric sensor.

On the other hand, an electronic apparatus according to the present embodiment forms a preview image by overlaying dynamic sensor information acquired by a sensor on a captured image and causes the display to display the preview image on the display. Also, the electronic apparatus according to the present embodiment stores the preview image displayed on the display as an overlay image in the memory 8. Although displaying the date information together with the image as described in the PLT 1 is popularly performed, it has not been conceived to display information detected by the sensors, such as those described in the PLT 2, together with an image. On the other hand, the electronic apparatus according to the present embodiment overlays acquired sensor information on a captured image when the image is captured. Further, the electronic apparatus according to the present embodiment stores the image having the sensor information overlaid thereon. Therefore, the electronic apparatus according to the present embodiment enables the user to visually confirm the captured image having the sensor information overlaid thereon in a desired form (i.e., position, size, etc.) and then to reliably store the captured image in real time.

Figure 1A:
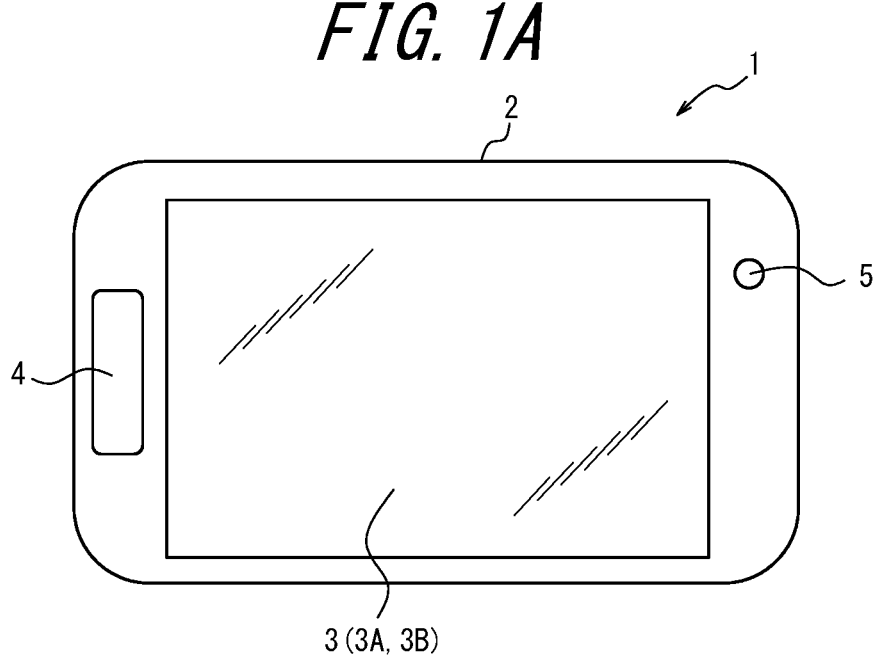
FIGS. 1A and 1B are external views of an electronic apparatus according to an embodiment of the present disclosure.
Figure 1B:
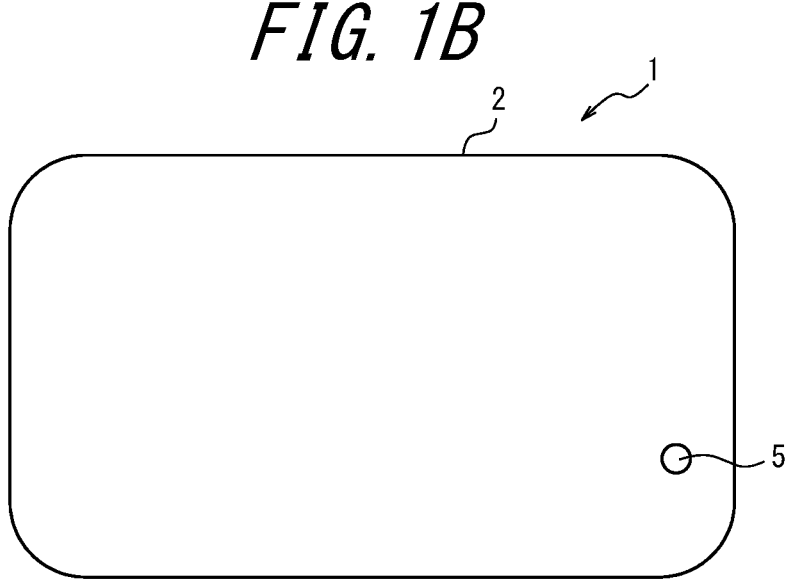

Referring to FIGS. 1A and 1B, the appearance of the electronic apparatus 1 according to the one embodiment will be described. FIGS. 1A and 1B are external views of the electronic apparatus 1 according to the one embodiment.

As illustrated in FIGS. 1A and 1B, the electronic apparatus 1 according to the one embodiment includes a housing 2, a touchscreen display 3, an operation button 4, and an imaging unit 5. The electronic apparatus 1 may be, but not limited to, a smartphone. The electronic apparatus 1 may be, for example, a feature phone or a tablet PC. The electronic apparatus 1 may be an imaging apparatus having a communication function and a sensor.

As illustrated in FIG. 1A, the touchscreen display 3 and the operation button 4 are arranged on one face (hereinafter, referred to as a "front face") of the housing 2. As illustrated in FIG. 1B, the imaging unit 5 is arranged on a face (hereinafter, referred to as a "rear face") opposite the front face of the housing 2. As illustrated in FIG. 1A, the imaging unit 5 may be arranged on the front face of the housing 2 as well.

Figure 2:
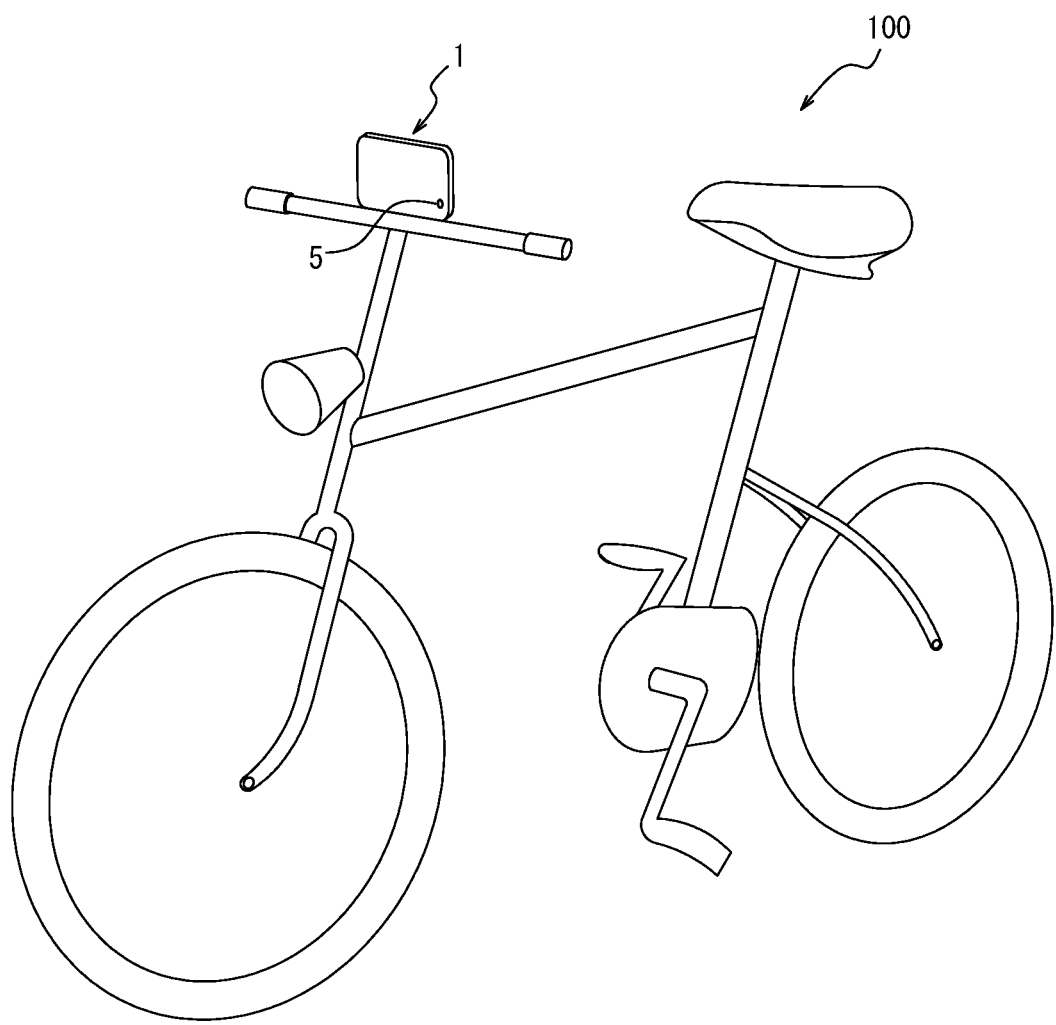
FIG. 2 is an external view of a bicycle on which the electronic apparatus illustrated in FIGS. 1A and 1B is mounted.

As illustrated in FIG. 2, for example, the electronic apparatus 1 may be mounted on a handle of a bicycle 100 for use. In this case, the electronic apparatus 1 is mounted in such a manner that the imaging unit 5 captures an image in a direction desired by a user, e.g., a traveling direction of the bicycle 100. Further, the electronic apparatus 1 is mounted in such a manner as to allow the user to view the touchscreen display 3. Thus, the user may view a captured image captured by the imaging unit 5 in real time while riding the bicycle 100.

The touchscreen display 3 includes a display 3A and an input interface 3B. The display 3A includes a display device such as an LCD (Liquid Crystal Display), an organic EL panel (Organic Electro-Luminescence panel), or an inorganic EL panel (Inorganic Electro-Luminescence panel). The display 3A displays characters, images, symbols, shapes, and so on. The display 3A receives data necessary for its display from the processor 6 described below. The display 3A may appropriately include a backlight and so on.

The input interface 3B detects contact made by user's finger or a stylus pen that is operating the touchscreen display 3. The input interface 3B may detect a position of contact made by the finger or the stylus pen on the touchscreen 3B. The input interface 3B may employ any detection method including a capacitive method, a resistive film method, a surface acoustic wave method (or an ultrasound method), an infrared method, an electromagnetic induction method, and a load detection method. A signal detected by the input interface 3B is output to the processor 6.

The operation button 4 detects a user operation performed thereto. Upon detecting the user operation, the operation button 4 outputs a detection signal to the processor 6. The user operation to the button 4 may be, but not limited to, single-click, double-click, push, long-push, or multiple-push.

The imaging unit 5 includes a camera configured to capture an image. The imaging unit 5 includes at least an optical system and an image sensor. The image sensor generates the captured image by converting a subject image formed on a light receiving face via the optical system into an image signal. The image sensor may be, for example, a CCD (Charge Coupled Device) image sensor or a CMOS (Complementary Metal Oxide Semiconductor) image sensor. The captured image captured by the imaging unit 5 is output to the processor 6.

Figure 3:
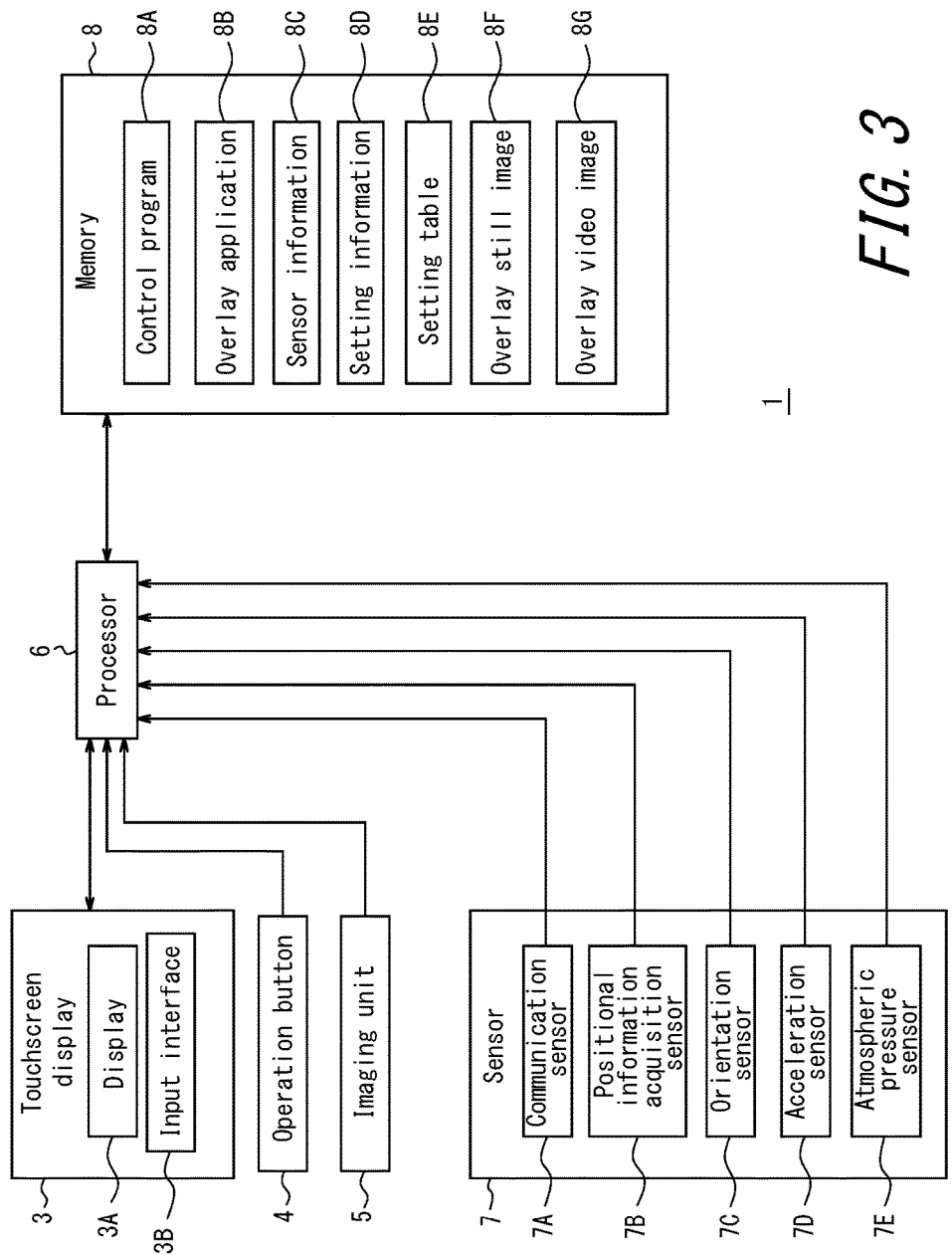
FIG. 3 is a functional block diagram schematically illustrating a configuration of the electronic apparatus illustrated in FIGS. 1A and 1B.

Referring to FIG. 3, next, a functional configuration of the electronic apparatus 1 according to the one embodiment will be described. FIG. 3 is a functional block diagram schematically illustrating a configuration of the electronic apparatus 1. The electronic apparatus 1 includes the processor 6, a sensor 7, and a memory 8 as illustrated in FIG. 3, in addition to the functional elements illustrated in FIGS. 1A and 1B. These functional elements are accommodated in the housing 2 illustrated in FIGS. 1A and 1B.

The processor 6 is, for example, a CPU (Central Processing Unit). The processor 6 may be an integrated circuit such as SoC (System-on-a-chip) in which other functional elements such as a communication sensor 7A are integrated. The processor 6 may be configured as a combination of a plurality of integrated circuits. The processor 6 controls each functional element of the electronic apparatus 1 and implements various functions by centrally controlling operation of the electronic apparatus 1. Operation of the processor 6 according to the one embodiment will be described in detail later.

The sensor 7 detects, as dynamic sensor information 8C, information about a detection target associated with the electronic apparatus 1 equipped with the sensor 7. The sensor 7 may detect a change in the detection target as the dynamic sensor information 8C by continuously detecting the detection target. The sensor 7 outputs the dynamic sensor information 8C to the processor 6.

The dynamic sensor information 8C is information that changes with time in accordance with a change in the state of the electronic apparatus 1. That is, the dynamic sensor information 8C does not include information such as a date that does not, or is not expected to, change in a predetermined time period. The dynamic sensor information 8C is, for example, speed information, distance information, altitude information, gravitational acceleration information, atmospheric pressure information, location information, route information, wind speed information, and orientation information. The sensor information 8C is not limited to the above information and may further include, for example, weather information, local information, mountain weather information, sea weather/wave-related information, snow-related information, sunrise/sunset information, tide, a stamp, a step count, and so on.

The sensor 7 includes the communication sensor 7A, a location sensor 7B, an orientation sensor 7C, an acceleration sensor 7D, and a pressure sensor 7E. The sensor 7 may omit the communication sensor 7A and include sensors for detecting a state of the electronic apparatus 1 such as the location sensor 7B, the orientation sensor 7C, the acceleration sensor 7D, and the pressure sensor 7E.

The communication sensor 7A transmits and receives information via a communication network. To transmit and receive information, the communication sensor 7A uses a communication method in conformity with a wireless communication standard. Examples of appropriate wireless communication standards are 2G (2nd Generation), 3G (3rd Generation), and 4G (4th Generation). Further examples of appropriate wireless communication standards are LTE (Long Term Evolution), W-CDMA, CDMA2000, PDC, GSM® (GSM is a registered trademark in Japan, other countries, or both), and PHS (Personal Handy-phone System). Further, wireless communication standards such as WiFi (The standard for Wireless Fidelity), WiMAX (Worldwide Interoperability for Microwave Access), IEEE802.11, Bluetooth® (Bluetooth is a registered trademark in Japan, other countries, or both), IrDA (Infrared Data Association), and NFC (Near field radio communication) may be used. The communication sensor 7A may support one or more of the communication standards mentioned above.

The communication sensor 7A acquires wind speed information indicating a wind speed at a position of the electronic apparatus 1 from an external server or the like, and outputs the wind speed information as sensor information 8C to the processor 6. The communication sensor 7A may acquire the weather information, the local information, the mountain weather information, the sea weather/wave-related information, the snow-related information, the sunrise/sunset information, the tide, the stamp, and the step count information as the sensor information 8C and output the sensor information 8C to the processor 6.

The location sensor 7B receives GPS signals indicating the position of GPS satellites and transmission times of the signals from the GPS satellites and thus acquires the location information that indicates the position of the electronic apparatus 1 on the basis of the GPS signals. The location sensor 7B successively acquires the location information and thus acquires the route information on the basis of a history of the position indicated by the location information. The location sensor 7B also acquires the speed information by calculating a change in the position of the electronic apparatus 1 per unit time as the speed of the electronic apparatus 1. The location sensor 7B also acquires the distance information indicating a trip distance of the electronic apparatus 1 calculated on the basis of the change in the position. Further, the location sensor 7B outputs, as the sensor information 8C, the location information, the route information, the speed information, and the distance information to the processor 6.

The orientation sensor 7C is, for example, a magnetic sensor or a gyro sensor. The orientation sensor 7C acquires the orientation information indicating an orientation based on a change in geomagnetism. The orientation sensor 7C outputs the orientation information to the processor 6.

The acceleration sensor 7D acquires gravitational acceleration information indicating gravitational acceleration of the electronic apparatus 1. The acceleration sensor 7D outputs the gravitational acceleration information as the sensor information 8C to the processor 6.

The pressure sensor 7E acquires atmospheric pressure information indicating atmospheric pressure around the electronic apparatus 1. The pressure sensor 7E also acquires altitude information indicating the altitude at the position of the electronic apparatus 1 on the basis of the atmospheric pressure. The pressure sensor 7E outputs the atmospheric pressure information and the altitude information as the sensor information 8C to the processor 6.

The memory 8 stores programs and data. The memory 8 is also used as a working area for provisionally storing processing results of the processor 6. The memory 8 may include any storage device such as a semiconductor storage device or a magnetic storage device. The memory 8 may include a plurality of different types of the storage devices. The memory 8 may include a combination of a portable storage media such as a memory card and a storage medium reader.

In particular, the memory 8 stores, for example, a control program 8A, an overlay application 8B, the sensor information 8C, a setting information 8D, a setting table 8E, an overlay still image 8F, and an overlay video image 8G The control program 8A and the overlay application 8B may be installed in the memory 8 via the wireless communication performed by the communication sensor 7A or the storage medium. The term "application" used herein is an abbreviation of an application program.

The control program 8A is a program for causing the electronic apparatus 1 to execute various functions. In particular, the processor 6 executes various functions by, for example, controlling each functional element on the control program 8A.

The overlay application 8B is an application used by the processor 6 to perform overlay processing. The overlay processing includes operation to form a preview image in which the sensor information 8C output from the sensor 7 is overlaid on the captured image captured by the imaging unit 5. The overlay processing also includes operation to store the preview image as the overlay still image 8F or the overlay video image 8G in the memory 8 on the basis of the setting information 8D and the setting table 8E.

Here, the overlay processing performed by the processor 6 on the overlay application 8B will be described in detail.

Prior to the start of the overlay processing according to the one embodiment, the processor 6, in accordance with a user operation, sets an option for overlaying the dynamic sensor information 8C on the captured image captured by the imaging unit 5.

Figure 4:
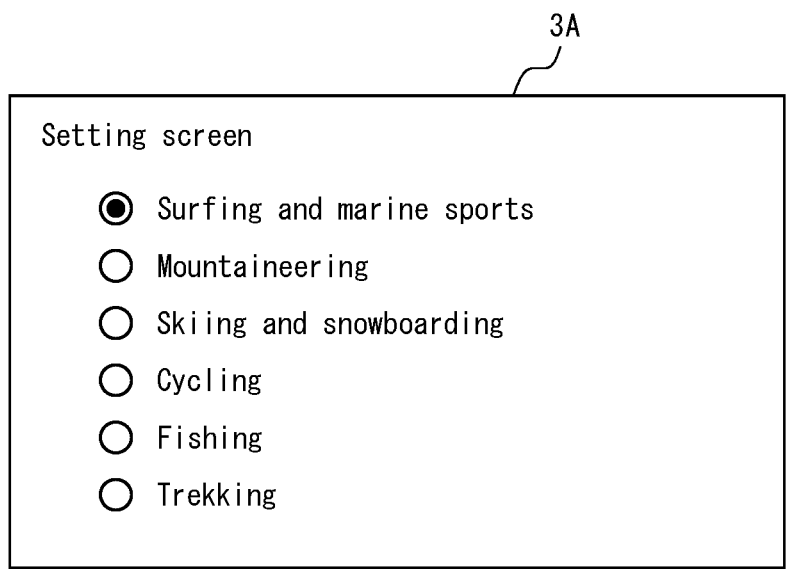
FIG. 4 is a diagram illustrating an example of a setting screen displayed on the display illustrated in FIG. 3.

In particular, the processor 6 first causes the display 3A to display options. The options may correspond, for example, to various usages of the electronic apparatus 1. In this case, as illustrated in FIG. 4, a setting screen includes the usages and radio buttons corresponding thereto as the options. The usages represent activities available to the user in association with the execution of the overlay processing and include, for example, "surfing and marine sports", "mountaineering", "skiing and snowboarding", "cycling", "fishing", and "trekking". In this case, upon detecting contact in respect of any one of the radio buttons, the processor 6 stores, in the memory 8, the setting information 8D indicating the usage corresponding to the radio button selected by the contact thereto.

In the subsequent overlay processing, the processor 6 forms the preview image in which the information is overlaid on the captured image using the setting table 8E. The setting table 8E is, for example, a table storing the sensor information 8C corresponding to the usages as illustrated in FIG. 5. When the usage is selected in the setting screen as described above, the processor 6 overlays the sensor information 8C corresponding to the usage selected in the setting table 8E from the sensor information 8C detected by the sensor 7 on the captured image. In addition to the sensor information 8C, the processor 6 may overlay, on the captured image, current date and time information or elapsed time information about an elapsed time from the start of the operation to store the overlay video image 8G which will be described later.

In the setting screen, checkboxes may be displayed in place of the radio buttons. In this case, the user may select one or more usages, and the processor 6 overlays information corresponding to the one or more selected usages on the captured image.

Figure 6:
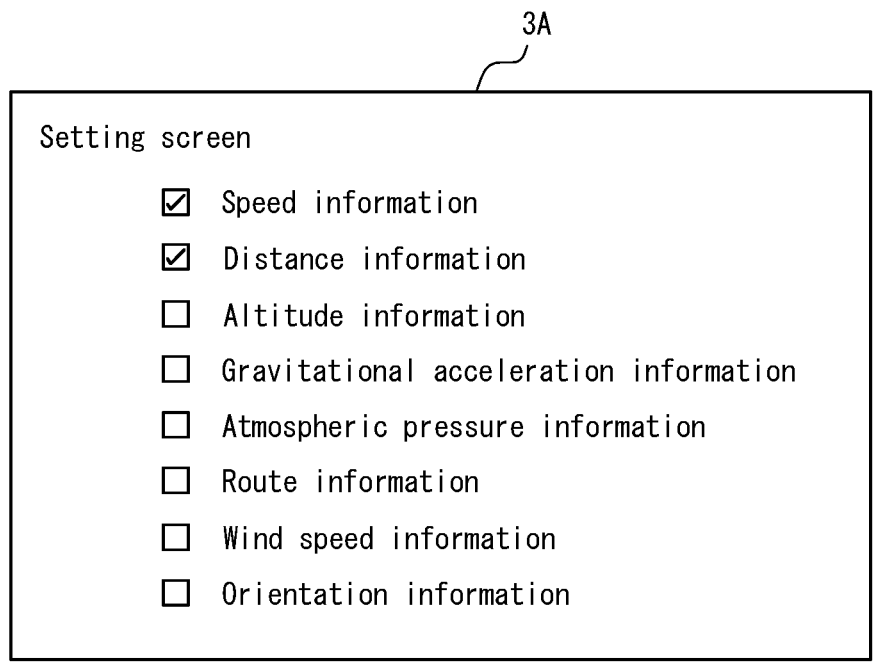
FIG. 6 is a diagram illustrating another example of the setting screen displayed on the display illustrated in FIG. 3.

In some examples, the options may correspond to the sensor information 8C to be overlaid on the captured image. In this case, as illustrated in FIG. 6, the setting screen displays, as the options, the available sensor information 8C and checkboxes corresponding thereto to allow user selection. Upon detecting contact in respect of one or more of the checkboxes, the processor 6 stores, in the memory 8, the setting information 8D indicating selection of the sensor information 8C corresponding to the one or more checkboxes to which the contact is made. Thus, in the subsequent overlay processing, the processor 6 overlays the selected sensor information 8C on the captured image.

If a predetermined operation to start the overlay processing is performed after the selection of the sensor information 8C, the processor 6 controls the imaging unit 5 to capture an image. Further, the processor 6 acquires the sensor information 8C on the basis of the information output from the sensor 7. The predetermined operation may include pushing the operation button 4 in a predetermined manner or contact in respect of a predetermined object displayed on the touch-screen display 3.

If an instruction to start the overlay processing is issued, the processor 6 acquires various sensor information 8C output from the sensor 7.

In particular, the processor 6 acquires the wind speed information output from the communication sensor 7A. The processor 6 acquires the location information, the route information, the speed information, and the distance information output from the location sensor 7B. The processor 6 acquires the orientation information output from the orientation sensor 7C. The processor 6 acquires the gravitational acceleration information output from the acceleration sensor 7D. The processor 6 acquires the atmospheric pressure information and the altitude information output from the pressure sensor 7E.

Further, the processor 6 forms the preview image in which the sensor information 8C is overlaid on the captured image on the basis of the setting information 8D.

Figure 7:
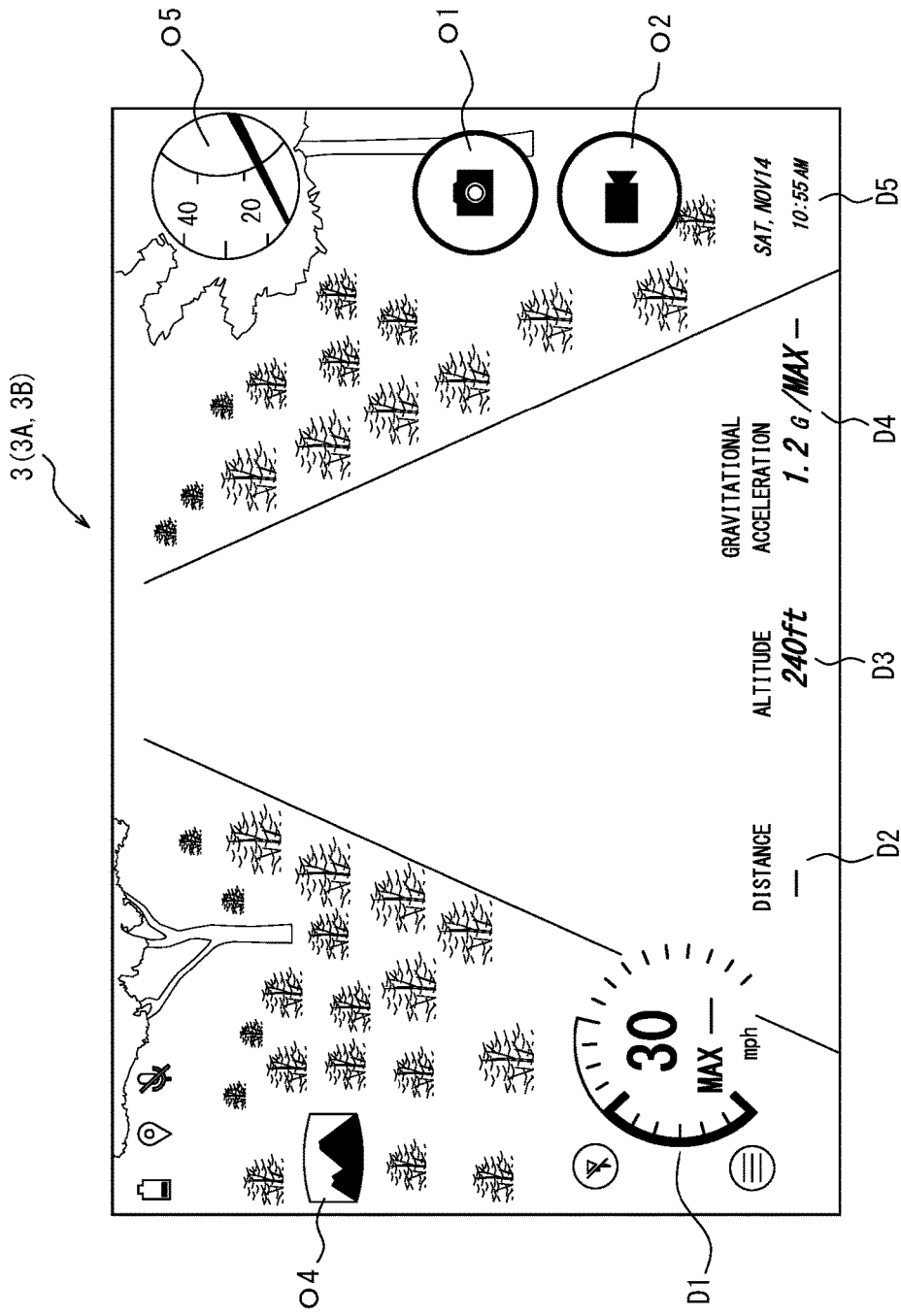
FIG. 7 is a diagram illustrating an example of a preview image displayed on the display illustrated in FIG. 3.

Preferably, an area of the captured image where the processor 6 overlays the sensor information 8C is an area of the captured image in which the user has less interest. Typically, the user storing the preview image having the sensor information 8C overlaid thereon as the video image is more interested in an area indicating farther ahead in the traveling direction rather than an area indicating an area right in front of the user. That is, the user is less likely to be interested in the area positioned lower in the captured image captured by the imaging unit 5 mounted facing the traveling direction. The user is more interested in a central area indicating where the user is going to pass and is relatively less interested in the far left and right areas. As such, the processor 6 causes the display 3A to display the sensor information 8C in a bottom area or the far right or left area in the captured image as illustrated in FIG. 7A. Thus, the sensor information 8C is prevented from being displayed in the area of the preview image where the user has more interest and thus prevented from obscuring the captured image.

The processor 6 causes the display 3A to display the preview image thus formed. In an example illustrated in FIG. 7, the processor 6 causes the display 3A to display a preview image in which images indicating speed information D1, distance information D2, altitude information D3, gravitational acceleration information D4, and current date and time information D5 are overlaid on the captured image. Each time the sensor information 8C is overlaid on the captured image, the preview image is continuously displayed on the display 3A. That is, the display 3A displays a preview image for a plurality of consecutive frames. In this case, the processor 6 may cause the display 3A to display the preview image in a so-called wide screen with a screen aspect ratio of 16:9. This, in particular, enables the user to view highly realistic images during outdoor activities.

The processor 6 causes the display 3A to display the preview image and a still image storing object O1. The still image storing object O1 is an object that allows the user to input an instruction to cause the processor 6 to store the preview image as the overlay still image 8F. Upon detecting contact in respect of the still image storing object O1, the processor 6 stores the preview image being displayed on the display 3A as the overlay still image 8F in the memory 8.

The processor 6 also causes the display 3A to display a video image storing object O2 on the display 3A. The video image storing object O2 is an object that allows the user to input an instruction to cause the processor 6 to store the overlay video image 8G Upon detecting contact in respect of the video image storing object O2, the processor 6 starts operation to store the overlay video image 8G in the memory 8.

Upon starting the operation to store the overlay video image 8G the processor 6 may continue to overlay the elapsed time information D6 on the captured image as illustrated in FIG. 8 until the operation to store the overlay video image 8G is completed.

The processor 6 may overlay the maximum speed information D7 on the captured image after starting the operation to store the overlay video image 8G The speed indicated by the maximum speed information D7 is acquired after the start of the operation to store the overlay video image 8G and indicates the highest speed among the speeds indicated by the speed information stored in the memory 8. In other words, the processor 6, at any time point of the storing process of the overlay video image 8G, overlays the maximum speed information D7 acquired during the period from a start point of storing process to the above mentioned time point of the storing process on the captured image.

The processor 6 may overlay the maximum gravitational acceleration information D8 on the captured image after starting the operation to store the overlay moving image 8G The maximum gravitational acceleration indicated by the maximum gravitational acceleration information D8 is acquired after the start of the operation to store the overlay video image 8G and indicates the maximum gravitational acceleration among the gravitational accelerations indicated by the gravitational acceleration information D4 stored in the memory 8.

Figure 9A:
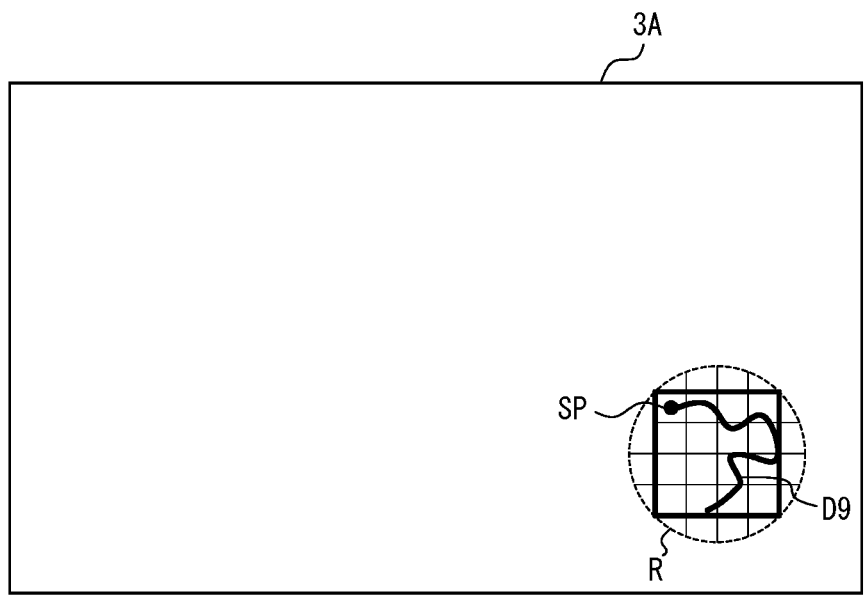
FIGS. 9A to 9C are diagrams schematically illustrating a method to display route information on the display illustrated in FIG. 3.

The processor 6 may overlay the route information D9 on the captured image after the start of the operation to store the overlay video image 8G A method used by the processor 6 to cause the display 3A to display the route information D9 will be described in detail with reference to FIG. 9.

The processor 6 overlays the route information D9 in a route display area R on the basis of the location information acquired by the location sensor 7B at predetermined time intervals.

Figure 9B:
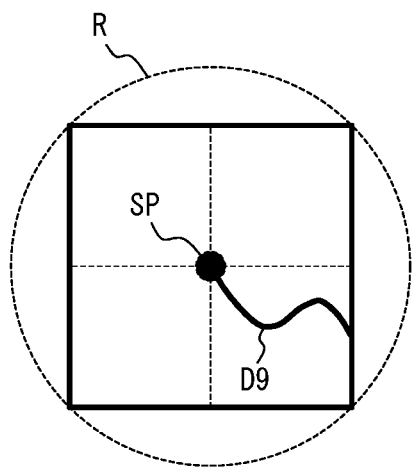

In overlaying the route information D9, the processor 6 sets the start point of the route in real space to a predetermined position (a start point SP) in an image space. The start point SP may be positioned at, but not limited to, the center of the route display area R as illustrated in FIG. 9B. Further, the processor 6 may set the traveling direction in real space immediately after the start of a trip from the start point to the vertically upward direction in the image space. The processor 6 may set a predetermined orientation in the real space, e.g., north, to the vertically upward direction in the image space.

The processor 6 overlays, on the captured image, the route information D9 acquired by downscaling (i.e. zooming out), to a predetermined scale, the history of the position in real space indicated by the location information acquired at predetermined time intervals. In this case, the processor 6 overlays the route information D9 in a direction in the image space which corresponds to a changing direction in the real space. The predetermined scale may be determined on the basis of an initial speed at a point when the operation to store the overlay video image 8G is started. The predetermined scale is appropriately designed in such a manner that an area in the image space corresponding to an area in the real space, to which the user is expected to move during the overlay processing of the route information, is included in the route display area R. In this case, preferably, the predetermined scale is designed to display the route information as large as possible.

If at least a part of the route information extends outside a predetermined area of the route display range R in the image space (e.g., within the bold square illustrated in FIG. 9B), the processor 6 changes the scale of the route information D9 from the predetermined scale mentioned above.

Figure 9C:
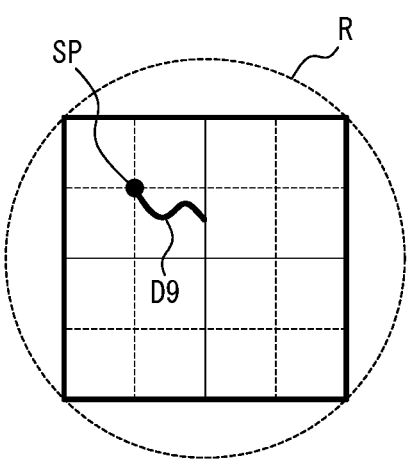

In other words, if the at least a part of the route information reaches an edge of the predetermined area, the processor 6 changes the scale of the route information D9. In particular, the processor 6 causes the display 3A to display the route by reducing the scale of the route in the image space relative to the route in the real space such that the route information D9 is fully included within the route display area R. That is, the processor 6 increases the downscaling of the route in the image space relative to the route in the real space. In the example illustrated in FIG. 9C, the scale of the route information is double the scale of that in the example illustrated in FIG. 9B. That is, the processor 6 sets the area in which the route information D9 to a quarter of that illustrated in FIG. 9B. Further, if the route information D9 reaches an edge of a predetermined area, the processor 6 expands the route display area R over areas adjacent to the edge. In the example illustrated in FIG. 9B, the edge of the predetermined area where the route information D9 reaches is located at the lower right of the starting point SP. In this case, the processor 6 expands the route display area R in the lower left, upper right, and lower right directions as illustrated in FIG. 9C. Note that, although in the example illustrated in FIG. 9C the processor 6 changes the position of the start point SP according to the change in the scale, the processor 6 may change the scale of the route information D9 without changing the position of the start point SP.

Referring back to FIG. 7, if the processor 6 starts the operation to store the overlay video image 8G in response to the contact in respect of the video image storing object O2, the processor 6 causes the display 3A to display an ending object O3 together with the preview image as illustrated in FIG. 8. The ending object O3 is an object that allows the user to input an instruction to end the operation to store the overlay video image 8G Upon detecting the contact in respect of the video image storing object O2, the processor 6 starts the operation to store the preview image continuously displayed on the display 3A as the overlay video image 8G in the memory 8. In response to contact in respect of the ending object O3, the processor 6 ends the operation to store the overlay video image 8G in the memory 8.

As described above, if a first predetermined operation is performed, the processor 6 causes the display 3A to display the preview image. Then, if a second predetermined operation is performed, the processor 6 causes the display 3A to keep displaying the preview image and starts the operation to store the preview image continuously displayed on the display 3A as the overlay video image 8G in the memory 8. Further, if a third predetermined operation is performed, the processor 6 ends the operation to store the overlay video image 8G in the memory 8.

On the display 3A, the processor 6 may display a mode object O4 indicating an imaging mode of the imaging unit 5 and an image object O5 indicating the overlay still image 8F already captured and stored in the memory 8 or a part of the overlay video image 8G Note that these objects O1 to O5 are not overlaid on either the overlay still image 8F or the overlay video image 8G.

Figure 10:
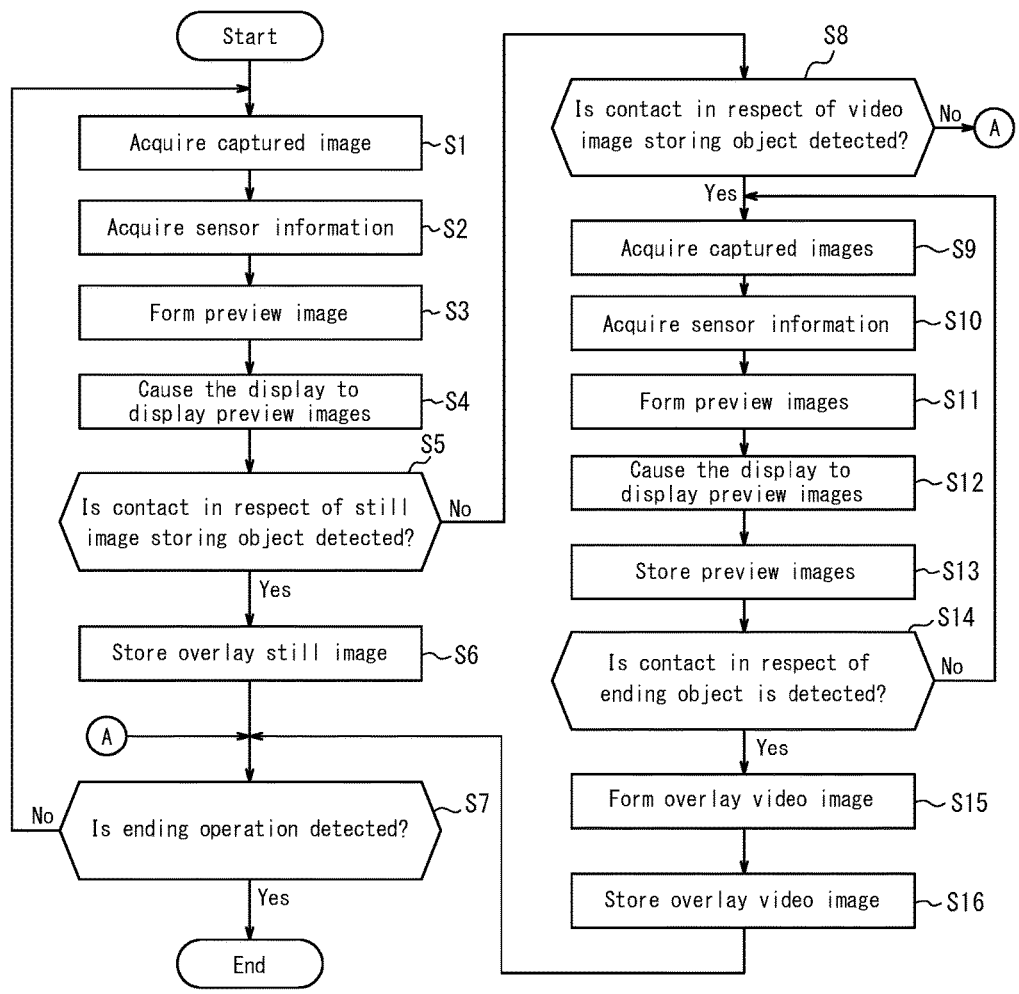
FIG. 10 is a flowchart illustrating an example of overlay processing performed by the processor illustrated in FIG. 3.

Referring now to a flowchart illustrated in FIG. 10, an example of the operation of the electronic apparatus 1 according to the one embodiment will be described. The electronic apparatus 1 starts the overlay processing if a predetermined operation is performed in respect of the electronic apparatus 1.

First, the processor 6 acquires the captured image captured by the imaging unit 5 (step S1).

Also, the processor 6 acquires the information detected by the sensor 7 as the sensor information 8C (step S2).

When the image is acquired in step S1 and the sensor information 8C is acquired in step S2, the processor 6 forms the preview image in which the sensor information 8C corresponding to the option indicated by the setting information 8D is overlaid on the captured image (step S3).

When the preview image is formed in step S3, the processor 6 causes the display 3A to display the preview image (step S4).

When the preview image is displayed in step S4, the processor 6 determines whether contact in respect of the still image storing object O1 is detected (step S5).

If contact in respect of the still image storing object O1 is detected in step S5, the processor 6 stores the preview image being displayed at the point when the contact is detected as the overlay still image 8F in the memory 8 (step S6).

When the overlay still image 8F is stored in step S6, the processor 6 determines whether an ending operation of the overlay processing is detected (step S7).

If the ending operation is detected in step S7, the processor 6 ends the overlay processing.

If the ending operation is not detected in step S7, the processor 6 returns to step S1 and repeats the procedures thereafter.

If contact in respect of the still image storing object O1 is not detected in step S5, the processor 6 determines whether contact in respect of the video image storing object O2 is detected (step S8).

If contact in respect of the video image storing object O2 is detected in step S8, the processor 6 again acquires the captured image captured by the imaging unit 5 (step S9).

Also, the processor 6 acquires the information detected by the sensor 7 as the sensor information 8C (step S10).

When the image is acquired in step S9 and the sensor information 8C is acquired in step S10, the processor 6 forms the preview image in which the sensor information 8C corresponding to the option indicated by the setting information 8D stored in the memory 8 is overlaid on the captured image (step S11).

When the preview image is formed in step S11, the processor 6 causes the display 3A to display the preview image (step S12).

Also, when the preview image is formed in step S11, the processor 6 stores the preview image in the memory 8 (step S13).

After the preview image is stored in step S13, the processor 6 determines whether contact in respect of the ending object O3 is detected (step S14).

If contact in respect of the ending object O3 is not detected in step S14, the processor 6 returns to step S9 and repeats the procedure thereafter.

If contact in respect of the ending object O3 is detected in step S14, the processor 6 forms the overlay video image 8G from the preview image of at least one frame stored by the repetition of the processing from step S9 to step S14 (step S15).

After the overlay video image 8G is formed in step S15, the processor 6 stores the overlay video image 8G in the memory 8 (step S16).

After the overlay video image 8G is stored in step S16, the processor 6 returns to step S7 and repeats the procedure thereafter.

According to the some embodiments, as described above, the electronic apparatus 1 causes the display 3A to display the preview image in which the dynamic sensor information 8C acquired from the sensor 7 is overlaid on the captured image captured by the imaging unit 5. This enables the user to view the captured image captured by the imaging unit 5 together with the sensor information 8C. Also, the user may confirm an overlaying manner of the sensor information 8C on the captured image as soon as the sensor information 8C is acquired.

The processor 6 stores still images in which sensor information is overlaid on captured images. More specifically, according to the some embodiments, the electronic apparatus 1 stores the preview image displayed on the display 3A as the overlay still image 8F in the memory 8. This enables the user to confirm in real-time the overlaying manner of the sensor information 8C that is acquired while the captured image is captured, and also to store a desired preview image.

The processor 6 may cause the display 3A to display overlay still images. More specifically, according to the some embodiments, the processor 6 may cause the display 3A to display the overlay still image 8E Accordingly, the user may view the same image as the preview image displayed at the timing of imaging by the imaging unit 5 after the image is captured.

According to the some embodiments, the electronic apparatus 1 causes the display 3A to display the preview images in which the dynamic sensor information 8C acquired by the sensor 7 is overlaid on the captured images captured by the imaging unit 5. This enables the user to view the captured images captured by the imaging unit 5 together with the sensor information 8C. Also, the user may confirm the overlaying manner of the sensor information 8C on the captured images as soon as the sensor information 8C is acquired.

The processor 6 stores video images in which sensor information is overlaid on captured images. More specifically, according to the some embodiments, the electronic apparatus 1 stores the preview images displayed on the display 3A as the overlay video image 8G in the memory 8. This enables the user to confirm in real-time the overlaying manner of the sensor information 8C that is acquired while the captured images are captured, and also to store preview images for a plurality of frames continuously for a desired time period as the overlay video image 8G Further, the user may view the preview images as the video and store the preview images as the overlay video image 8G and enjoy a realistic feeling during and after the captured images are captured.

The processor 6 may cause the display 3A to display overlay video images. More specifically, according to the some embodiments, the processor 6 may cause the display 3A to display the overlay video image 8G Accordingly, the user may view the same video as the preview image displayed at the timing of imaging by the imaging unit 5 after the image is captured.

According to the some embodiments, the sensor 7 may detect a change in the surrounding conditions. The sensor information 8C is dynamic information which changes with time in accordance with changes in the surrounding conditions. For users who are participating in activities that are affected by the surrounding conditions, it is important to have a quantitative understanding of changes in the surrounding conditions. Overlaying the sensor information 8C indicating the changes in the surrounding conditions on the captured image may enable the user to quantitatively understand the changes by viewing the image indicating the surrounding conditions and making judgments as to whether to take effective action.

According to the some embodiments, the electronic apparatus 1 overlays the dynamic sensor information 8C on the captured image each time the captured image is captured. Thus, the electronic apparatus 1 may overlay the sensor information 8C on the captured image in a simple manner by using a conventional CPU and memory and without using a specialized chip.

According to the some embodiments, when the option for overlaying the dynamic sensor information 8C on the captured image is selected by the input interface 3B before an image is captured, at least the dynamic sensor information 8C corresponding to the option is overlaid on the captured image. Thus, from among the available sensor information 8C, the electronic apparatus 1 may only overlay the sensor information 8C desired by the user on the captured image. This allows the user to view the desired sensor information 8C alone by eliminating undesired sensor information 8C that can be confusing. Further, the sensor information 8C corresponding to the various usages of the electronic apparatus 1 is stored in advance, thus enabling the user to avoid the trouble of selecting the sensor information 8C one by one and instead to readily overlay the sensor information 8C which is likely to be desired according to the various usages on the captured image.

According to the some embodiments, further, the electronic apparatus 1 causes the display 3A to display the route information on the display 3A on the basis of the location information of the electronic apparatus 1 acquired by the location sensor 7B at the predetermined intervals. For users whose main purpose is a trip, it is important to grasp the route information indicating the route history of the trip. Overlaying the route information on the captured image enables the user to confirm the route information while viewing the image indicating the surrounding conditions. Also, since the route information is information indicating the route history of the trip, it is difficult to predict how far the user will go from the start point at the time of departure. In some cases, therefore, when the route information at a predetermined scale is displayed in the route display area R on the display 3A, the route information may not be fully included within the route display area R. However, if the route information reaches the edge of the predetermined area, the scale of the route information is reduced such that the route information is fully included in the route display area R. Accordingly, the user may appropriately confirm the route information.

The above embodiment describes a typical example, and it should be apparent to those who are skilled in the art that various changes and substitutions may be implemented within the spirit and scope of the present disclosure. Accordingly, the present disclosure should not be construed as limited to the above embodiment but may be altered or changed in various manners without departing from the scope of the claims. For example, a plurality of constituent blocks in the above embodiment may be combined together, or one constituent block may be divided.

Although in the above embodiment the processor 6 causes the display 3A to display the still image storing object O1 and the video image storing object O2 together with the preview image, this is not restrictive. For example, the processor 6 may cause the display 3A to display one of the still image storing object O1 and the video image storing object O2 on the basis of the usage set by the user. When the usage being set is, for example, "surfing and marine sports", "mountaineering", "skiing and snowboarding" or "cycling", the processor 6 may cause the display 3A to display the video image storing object O2 together with the preview image. When the usage being set is, for example, "fishing"

or "trekking", the processor 6 may cause the display 3A to display the still image storing object O1 together with the preview image.

Typically, users who select "surfing and marine sports", "mountaineering", "skiing and snowboarding" and "cycling" actively move and have great interests in landscape observed during the activity and changes in the sensor information 8C in accordance with changes in the landscape. Thus, users who select these usages often desire to store the video images rather than the still images. In this case, accordingly, displaying the video image storing object O2 alone in advance enables smooth operation by the user to store the preview images. That is, it is more convenient for the user.

On the other hand, users who select "fishing" or "trekking" may have a great interest in a result of the activity, e.g., fishing, and the sensor information 8C when the result is acquired. Thus, users who select these usages often desire to store the still images rather than the video images. In this case, accordingly, displaying the still image storing object O1 alone in advance enables smooth operation by the user to store the preview image. That is, it is more convenient for the user.

The invention claimed is:

1. An electronic apparatus comprising:
   a camera, a sensor, a memory, a display, and at least one processor,
   wherein the at least one processor is configured to
   cause the display to display a preview image in which dynamic sensor information acquired by the sensor is overlaid on a captured image captured by the camera when a predetermined operation to start the overlay processing is performed,
   display continuously the preview image in which the dynamic sensor information is overlaid on the captured image and start an operation to store the preview image in the memory when a predetermined operation to start the video image store processing is performed after causing the display to display the preview image,
   end an operation to store the preview image in the memory when a predetermined operation to end the video image store processing is performed,
   overlay route information of the electronic apparatus as the dynamic sensor information on the captured image, the route information being a history of location information of the electronic apparatus acquired by a location sensor at predetermined time intervals, and
   overlay a downscaled image of the route information on the captured image when determining that the route information extends outside of a predetermined area on the display.

2. The electronic apparatus according to claim 1,
   wherein the sensor is capable of detecting a change in a detection target associated with the electronic apparatus, and
   the dynamic sensor information changes with time in accordance with a change in the detection target associated with the electronic apparatus.

3. The electronic apparatus according to claim 1,
   wherein the captured image is captured at predetermined time intervals, and
   the at least one processor is configured to,
   each time the captured image is captured, causes the display to display the preview image in which the dynamic sensor information is overlaid on the captured image, and
   causes the display to display the preview image while storing the video image.

4. The electronic apparatus according to claim 1,
   further comprising an input interface,
   wherein the at least one processor is configured to, if a menu option for overlaying the dynamic sensor information on the captured image is selected by the input interface before capturing, overlay at least the dynamic sensor information corresponding to the menu option on the captured image.

5. An electronic apparatus according to claim 1, wherein the at least one processor is configured to overlay the downscaled image after the route information to be displayed is located beyond the predetermined area.

6. An electronic apparatus according to claim 1, wherein the at least one processor is configured to overlay the downscaled image in place of the route information.

* * * * *